(12) United States Patent
Griffin et al.

(10) Patent No.: US 11,868,850 B2
(45) Date of Patent: Jan. 9, 2024

(54) PREVENTING QUANTUM ERRORS USING A QUANTUM ERROR CORRECTION ALGORITHM TRAINER (QECAT) TABLE

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 124 days.

(21) Appl. No.: 17/536,906

(22) Filed: Nov. 29, 2021

(65) Prior Publication Data

US 2023/0168956 A1 Jun. 1, 2023

(51) Int. Cl.
*G06N 10/70* (2022.01)
*G06F 11/00* (2006.01)
*G06N 10/00* (2022.01)

(52) U.S. Cl.
CPC ........... *G06N 10/70* (2022.01); *G06F 11/004* (2013.01); *G06N 10/00* (2019.01)

(58) Field of Classification Search
CPC ...... G06F 11/004; G06N 10/00; G06N 10/70; G06N 10/80
See application file for complete search history.

(56) References Cited

U.S. PATENT DOCUMENTS

| 6,128,764 | A | * | 10/2000 | Gottesman | G06N 10/00 714/785 |
|---|---|---|---|---|---|
| 10,692,009 | B2 | | 6/2020 | Kelly | |
| 10,740,165 | B2 | | 8/2020 | Bhardwaj | |
| 10,922,166 | B2 | | 2/2021 | Hogaboam | |
| 2019/0044542 | A1 | | 2/2019 | Hogaboam et al. | |
| 2020/0394546 | A1 | * | 12/2020 | Bronn | ..................... H01L 25/18 |
| 2021/0067176 | A1 | | 3/2021 | Leipold et al. | |
| 2021/0200626 | A1 | | 7/2021 | Rhee et al. | |

OTHER PUBLICATIONS

Peter Young, Quantum error correction, pp. 1 to 31 (retrieved from Google 9-24-2-23). (Year: 2020).*
Nautrup, H. et al., "Optimizing Quantum Error Correction Codes with Reinforcement Learning," arXiv:1812.08451v5 [quant-ph], Apr. 9, 2020, 21 pages.
Valenti, A. et al., "Hamiltonian learning for quantum error correction," Physical Review Research I, Nov. 11, 2019, American Physical Society, 14 pages.

* cited by examiner

*Primary Examiner* — Shelly A Chase
(74) *Attorney, Agent, or Firm* — Dority & Manning, P.A.

(57) ABSTRACT

Preventing quantum errors using a Quantum Error Correction Algorithm Trainer (QECAT) table is disclosed herein. In one example, a processor device of a computing device is to identify a subset of a plurality of QECAT table entries of a QECAT table, wherein each QECAT table entry of the subset corresponds to an occurrence of a quantum error. The processor device is further to obtain metadata from each QECAT table entry of the subset. The processor device identifies, based on the metadata from each QECAT table entry of the subset, a common characteristic of each occurrence of the quantum error. The processor device then determines, based on the common characteristic, a preventative action to prevent a future occurrence of the quantum error.

20 Claims, 8 Drawing Sheets

PREVENTING QUANTUM ERRORS USING A QUANTUM ERROR CORRECTION ALGORITHM TRAINER (QECAT) TABLE

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. Because of the inherent instability of qubits, quantum computing devices employ quantum error correction (QEC) mechanisms to detect and remedy quantum errors that may occur while executing quantum services. As quantum computing continues to increase in popularity and become more commonplace, an ability to efficiently prevent the occurrence of quantum errors will be desirable.

SUMMARY

The examples disclosed herein prevent quantum errors using a Quantum Error Correction Algorithm Trainer (QECAT) table. In one example, a QECAT service, executing on a computing device (classical or quantum), provides a mechanism by which a corrective action performed by a conventional quantum error correction (QEC) service in response to a quantum error may be recorded in a QECAT table in association with metadata relating to the occurrence of the quantum error. The QECAT service subsequently identifies a subset of QECAT table entries that correspond to occurrences of the quantum error and retrieves the metadata from the subset of QECAT table entries. Based on the metadata, the QECAT service identifies a common characteristic of each occurrence of the quantum error and determines a preventative action to prevent a future occurrence of the quantum error.

In another example, a method for preventing quantum errors using a QECAT table is disclosed. The method comprises identifying, by a computing device, a subset of a plurality of QECAT table entries of a QECAT table, wherein each QECAT table entry of the subset corresponds to an occurrence of a quantum error. The method further comprises obtaining metadata from each QECAT table entry of the subset. The method also comprises identifying, based on the metadata from each QECAT table entry of the subset, a common characteristic of each occurrence of the quantum error. The method additionally comprises determining, based on the common characteristic, a preventative action to prevent a future occurrence of the quantum error.

In another example, a computing system for preventing quantum errors using a QECAT table is disclosed. The computing system comprises a computing device that comprises a first system memory and a first processor device communicatively coupled to the first system memory. The first processor device is to identify a subset of a plurality of QECAT table entries of a QECAT table, wherein each QECAT table entry of the subset corresponds to an occurrence of a quantum error. The first processor device is further to obtain metadata from each QECAT table entry of the subset. The first processor device is also to identify, based on the metadata from each QECAT table entry of the subset, a common characteristic of each occurrence of the quantum error. The first processor device is additionally to determine, based on the common characteristic, a preventative action to prevent a future occurrence of the quantum error.

In another example, a non-transitory computer-readable medium is disclosed. The non-transitory computer-readable medium stores thereon computer-executable instructions that, when executed, cause one or more processor devices to identify a subset of a plurality of QECAT table entries of a QECAT table, wherein each QECAT table entry of the subset corresponds to an occurrence of a quantum error. The computer-executable instructions further cause the one or more processor devices to obtain metadata from each QECAT table entry of the subset. The computer-executable instructions also cause the one or more processor devices to identify, based on the metadata from each QECAT table entry of the subset, a common characteristic of each occurrence of the quantum error. The computer-executable instructions additionally cause the one or more processor devices to determine, based on the common characteristic, a preventative action to prevent a future occurrence of the quantum error.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first processor device" and "second processor device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such that superposition and entanglement) that differ from those of classical (i.e., non-quantum) bits used in classical computing. Qubits may be employed by quantum services that are executed by quantum computing devices. While qubits can be used to perform operations that would be impractical or impossible to perform with classical bits, qubits also suffer from inherent instabilities that may be caused by factors such as susceptibility to interference from their operating environments, faulty preparation, faulty gates, and the like. These instabilities may manifest as quantum errors, such as incorrect data values and/or quantum states, that affect the qubits.

For this reason, conventional quantum computing devices employ quantum error correction (QEC) services to detect and remedy quantum errors that may occur while executing quantum services. Such QEC services make use of a large number of additional qubits (relative to the number of qubits required to perform a quantum operation) to detect quantum errors that may occur, and to perform corrective actions. However, the allocation and maintenance of these additional qubits for quantum error detection and correction incurs additional overhead that may negatively impact the performance of a quantum computing device.

In this regard, examples disclosed herein implement a Quantum Error Correction Algorithm Trainer (QECAT) service for preventing quantum errors using a QECAT table. In one example, a QECAT service, executing on a computing device (classical or quantum), provides a QECAT table that stores a plurality of QECAT table entries. Each QECAT table entry within the QECAT table corresponds to a previous occurrence of a quantum error and stores metadata associated with the previous occurrence of the quantum error. The metadata may include, as non-limiting examples, information relating to the quantum error itself (e.g., an indication of a quantum error type, a timestamp indicating when the quantum error occurred, and/or an indication of a corrective action taken by a QEC service to correct the quantum error), information relating to a qubit affected by the quantum error (e.g., a qubit identifier and/or a source Quantum Assembly (QASM) file identifier for the qubit), and/or information relating to the operating environment of the quantum computing device (e.g., an identifier of one or more concurrently executing quantum services, an identifier of one or more scheduled quantum services, and/or an indication of an environmental attribute).

In exemplary operation, the QECAT service identifies a subset of the QECAT table entries that correspond to an occurrence of a quantum error and obtains metadata from each QECAT table entry of the subset. Based on the metadata, the QECAT service identifies a common characteristic of each occurrence of the quantum error. The common characteristic may comprise, as non-limiting examples, a quantum service that was executing during each occurrence of the quantum error, a particular qubit that was in use during each occurrence of the quantum error, and/or an operating environment characteristic of a quantum computing device (e.g., temperature, geographic location, processor load, and the like) during each occurrence of the quantum error.

Based on the common characteristic, the QECAT service determines a preventative action to prevent a future occurrence of the quantum error. For example, if the QECAT service's analysis of the metadata identifies a common characteristic of an operating environment in which the quantum error occurred (e.g., the quantum error occurred within a specific temperature range), the preventative action may comprise executing a quantum service by a quantum computing device only if the common characteristic does not apply to a current operating environment (e.g., a current temperature) of the quantum computing device. The preventative action in some examples may comprise modifying a QASM file based on the common characteristic (e.g., if the quantum error is related to a particular quantum service, a particular qubit, a particular gate configuration, and the like, as non-limiting examples). In examples in which the common characteristic relates to, e.g., a specific quantum computing device or hardware, the preventative action may comprise selecting a quantum computing device on which to execute a quantum service.

Some examples may provide that, prior to identifying the subset of the plurality of QECAT table entries, the QECAT service may determine that a QEC operation has been performed by a QEC service of a quantum computing device in response to a first occurrence of the quantum error. The QECAT service may then obtain first metadata associated with the first occurrence of the quantum error and store the first metadata in a QECAT table entry of the plurality of QECAT table entries.

Figure 1:
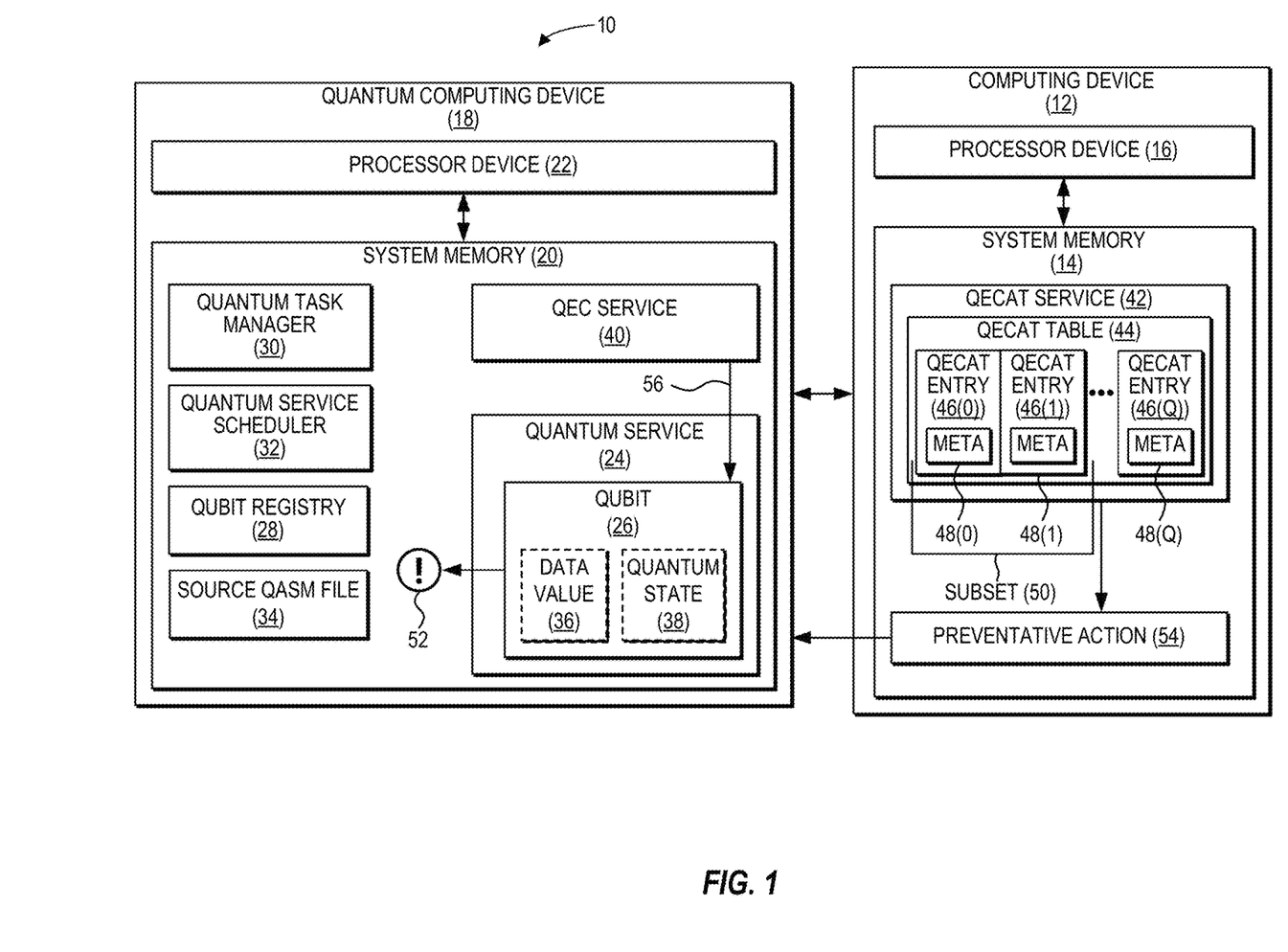
FIG. 1 is a block diagram of a computing system in which examples may be practiced.

FIG. 1 is a block diagram of a computing system 10 according to one example. The computing system 10 includes a computing device 12 that comprises a system memory 14 and a processor device 16, and further includes a quantum computing device 18 that comprises a system memory 20 and a processor device 22. In the example of FIG. 1, the computing device 12 is a classical computing device, but some examples may provide that the computing device 12 is a quantum computing device analogous in functionality and composition to the quantum computing device 18. The computing device 12 and the quantum computing device 18 of FIG. 1 are communicatively coupled via a classical communications link, which may comprise a private network or a public network such as the internet. The quantum computing device 18 may also be communicatively coupled to other quantum computing devices (not shown) via a quantum channel (not shown) over which qubits may be transmitted. It is to be understood that the computing system 10, according to some examples, may include more or fewer quantum computing devices and/or classical computing devices than illustrated in FIG. 1. Additionally, the computing device 12 and/or the quantum computing device 18 in some examples may include constituent elements in addition to those illustrated in FIG. 1.

The quantum computing device 18 in the example of FIG. 1 operates in quantum environments but is capable of operating using classical computing principles or quantum computing principles. When using quantum computing principles, the quantum computing device 18 performs computations that utilize quantum-mechanical phenomena, such as superposition and/or entanglement states. The quantum computing device 18 may operate under certain environmental conditions, such as at or near zero degrees (0°) Kelvin. When using classical computing principles, the quantum computing device 18 utilizes binary digits that have a value of either zero (0) or one (1).

In the example of FIG. 1, the quantum computing device 18 executes a quantum service 24, which comprises a process that employs one or more qubits such as a qubit 26 to perform quantum operations. To maintain information for qubits such as the qubit 26, the quantum computing device 18 may include a qubit registry 28, which comprises a plurality of qubit registry entries (not shown) that each correspond to a qubit. The qubit registry 28 maintains and provides access to data relating to the qubits implemented by the quantum computing device 18, including a count of the total number of qubits implemented by the quantum computing device 18 and a count of the number of available qubits that are currently available for allocation, as non-limiting examples. Each of the qubit registry entries of the qubit registry 28 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

Execution of quantum services such as the quantum service 24 is facilitated by a quantum task manager 30 and a quantum service scheduler 32, each of which operates in a manner analogous to their conventional classical counterparts. Thus, the quantum task manager 30 of the quantum computing device 18 handles operations for creating, monitoring, and terminating quantum services, while the quantum service scheduler 32 of the quantum computing device 18 controls the scheduling of quantum services for execution by the processor device 22 and the allocation of processing resources to executing quantum services. The functionality of the qubit registry 28, the quantum task manager 30, and/or the quantum service scheduler 32 may be made accessible to other services, processes, and/or computing devices (e.g., via a defined application programming interface (API), as a non-limiting example). Although not shown in FIG. 1, it is to be understood that, in examples in which the computing device 12 is a quantum computing device, the computing device 12 implements functionality corresponding to the qubit registry 28, the quantum task manager 30, and the quantum service scheduler 32 of the quantum computing device 18.

The quantum service 24 may be associated with a source QASM file 34, which provides quantum programming instructions that define the quantum service 24 and that configure and manipulate the qubit 26. The qubit 26 of the quantum service 24 may be used to store a data value 36, and/or may have a quantum state 38 (e.g., spin, as a non-limiting example) into which the qubit 26 is programmatically placed.

As noted above, qubits such as the qubit 26 suffer from inherent instabilities that are caused by factors such as susceptibility to interference from the operating environment of the quantum computing device 18 (e.g., by electronic noise generated by operation of the quantum computing device 18, temperature fluctuations within the quantum computing device 18, interference generated by other executing quantum services, and the like), as well as by faulty preparation, faulty gates, and other issues. These instabilities may manifest as a quantum error that affects the qubit 26 by, for example, incorrectly changing the data value 36 and/or the quantum state 38 of the qubit 26. To detect and correct such quantum errors, the quantum computing device 18 provides a QEC service 40. The QEC service 40 may use multiple error correcting qubits (not shown), placed in an entangled state with qubits such as the qubit 26, to detect and remedy quantum errors. However, due to the additional overhead incurred by allocating and managing the additional qubits required by the QEC service 40, it is desirable to prevent the occurrence of quantum errors, and thereby reduce or obviate the need for the QEC service 40.

In this regard, the computing device 12 of FIG. 1 implements a QECAT service 42 for preventing quantum errors using a QECAT table 44. The QECAT table 44 is implemented in a manner analogous to a conventional database table and includes a plurality of QECAT table entries (captioned as "QECAT ENTRY" in FIG. 1) 46(0)-46(Q), each of which corresponds to a previous occurrence of a quantum error. The QECAT table entries 46(0)-46(Q) store metadata (captioned as "META" in FIG. 1) 48(0)-48(Q), respectively, that is associated with each corresponding previous occurrence of a quantum error, and that is obtained by the QECAT service 42 (e.g., from the QEC service 40 of the quantum computing device 18) when a quantum error is detected (e.g., by the QEC service 40). The metadata 48(0)-48(Q) each may be stored as binary or textual data, or a combination thereof.

In some examples, the metadata 48(0)-48(Q) may include information relating to each corresponding quantum error itself, such as an indication of a quantum error type, a timestamp indicating when the quantum error occurred, and/or an indication of a corrective action taken by the QEC service 40 to correct the quantum error. Some examples may provide that the metadata 48(0)-48(Q) may include information relating to a qubit affected by each corresponding quantum error, such as a qubit identifier and/or a source QASM file identifier for the qubit. According to some examples, the metadata 48(0)-48(Q) may include information relating to the operating environment of a quantum computing device, such as an identifier of one or more concurrently executing quantum services, an identifier of one or more scheduled quantum services, and/or an indication of an environmental attribute of a quantum computing device (e.g., an operating temperature at a particular point in time).

In exemplary operation, the QECAT service 42 identifies a subset 50 of the QECAT table entries 46(0)-46(Q) (in this example, QECAT table entries 46(0) and 46(1)) that correspond to an occurrence of a quantum error 52. The QECAT service 42 then obtains metadata from each QECAT table entry of the subset 50. Thus, in the example of FIG. 1, the QECAT service 42 would obtain the metadata 48(0) and 48(1).

The QECAT service 42 then identifies a common characteristic of each occurrence of the quantum error 52 based on the metadata 48(0) and 48(1). As non-limiting examples, the common characteristic may comprise a quantum service that was executing during each occurrence of the quantum error 52, a particular qubit that was in use during each occurrence of the quantum error 52, and/or an operating environment characteristic of a quantum computing device (e.g., temperature, geographic location, processor load, and the like) during each occurrence of the quantum error 52.

Based on the common characteristic, the QECAT service 42 determines a preventative action 54 (e.g., an action that may be performed by a quantum computing device such as the quantum computing device 18) to prevent a future occurrence of the quantum error 52. For example, if the analysis of the metadata 48(0) and 48(1) by the QECAT service 42 identifies a common characteristic of an operating environment in which the quantum error 52 occurred, the preventative action 54 may comprise executing a quantum service such as the quantum service 24 only if the common characteristic does not apply to a current operating environment (e.g., a current temperature) of the quantum computing device 18. The preventative action 54 in some examples may comprise modifying a source QASM file such as the source QASM file 34 based on the common characteristic (e.g., if the quantum error 52 is related to a particular quantum service, a particular qubit, a particular gate configuration, and the like, as non-limiting examples). In examples in which the common characteristic relates to, e.g., a specific quantum computing device or hardware, the preventative action may comprise selecting a quantum computing device, such as the quantum computing device 18 or another quantum computing device, on which to execute a quantum service such as the quantum service 24.

Some examples may provide that, prior to identifying the subset 50 of the plurality of QECAT table entries 46(0)-46(Q), the QECAT service 42 may determine that a QEC operation 56 has been performed by the QEC service 40 of the quantum computing device 18 in response to a first occurrence of the quantum error 52. The QECAT service 42 may then obtain first metadata (e.g., the metadata 48(0), as a non-limiting example) associated with the first occurrence of the quantum error 52 and store the first metadata 48(0) in a QECAT table entry (such as the QECAT table entry 46(0)) of the plurality of QECAT table entries 46(0)-46(Q).

It is to be understood that, because the QECAT service 42 is a component of the computing device 12, functionality implemented by the QECAT service 42 may be attributed to the computing system 10 generally. Moreover, in examples where the QECAT service 42 comprises software instructions that program the processor device 16 to carry out functionality discussed herein, functionality implemented by the QECAT service 42 may be attributed herein to the processor device 16. It is to be further understood that while, for purposes of illustration only, the QECAT service 42 is depicted as a single component, the functionality implemented by the QECAT service 42 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
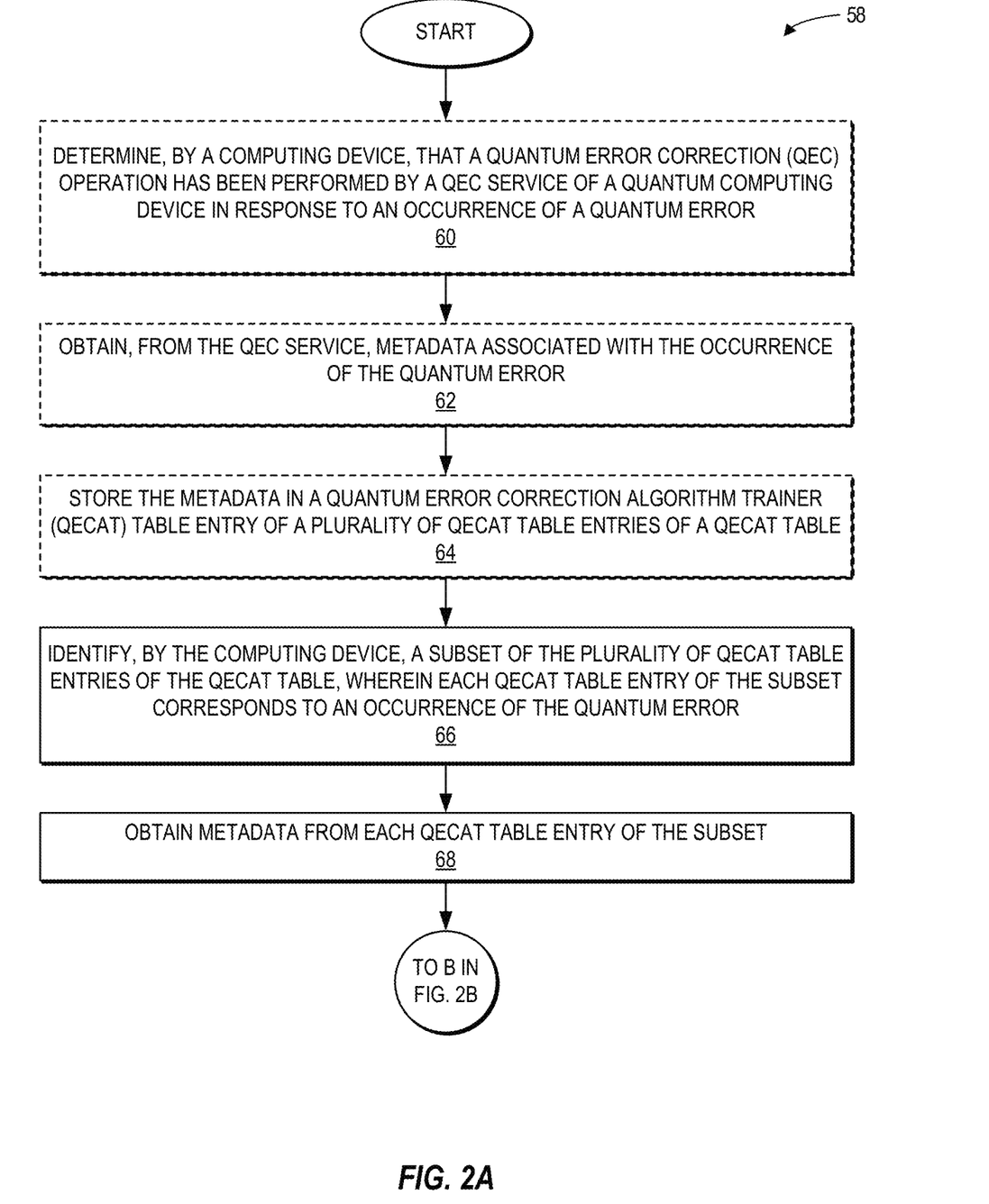
FIGS. 2A-2C are flowcharts illustrating operations performed by the computing system of FIG. 1 for preventing quantum errors using a Quantum Error Correction Algorithm Trainer (QECAT) table, according to one example.
Figure 2B:
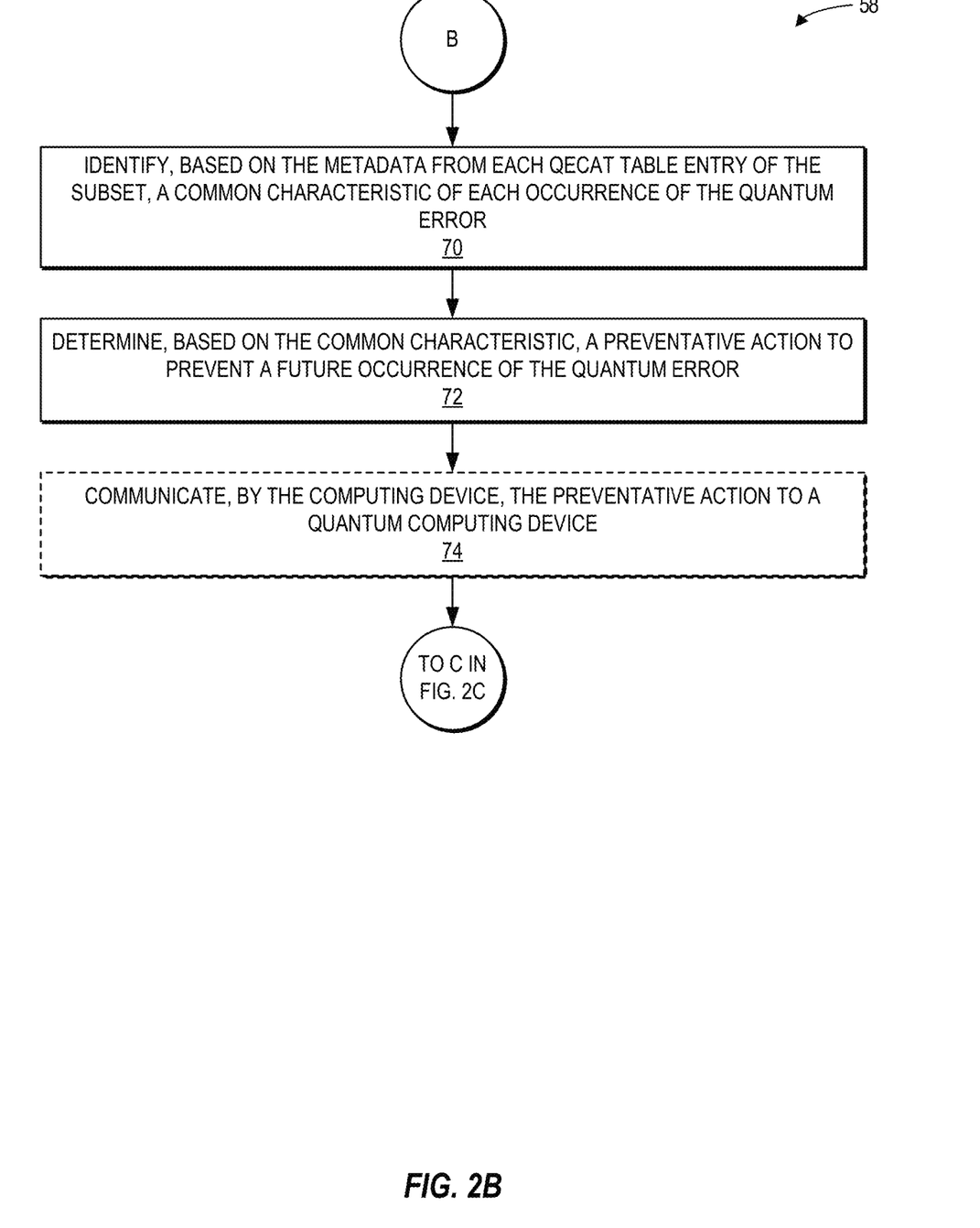
Figure 2C:
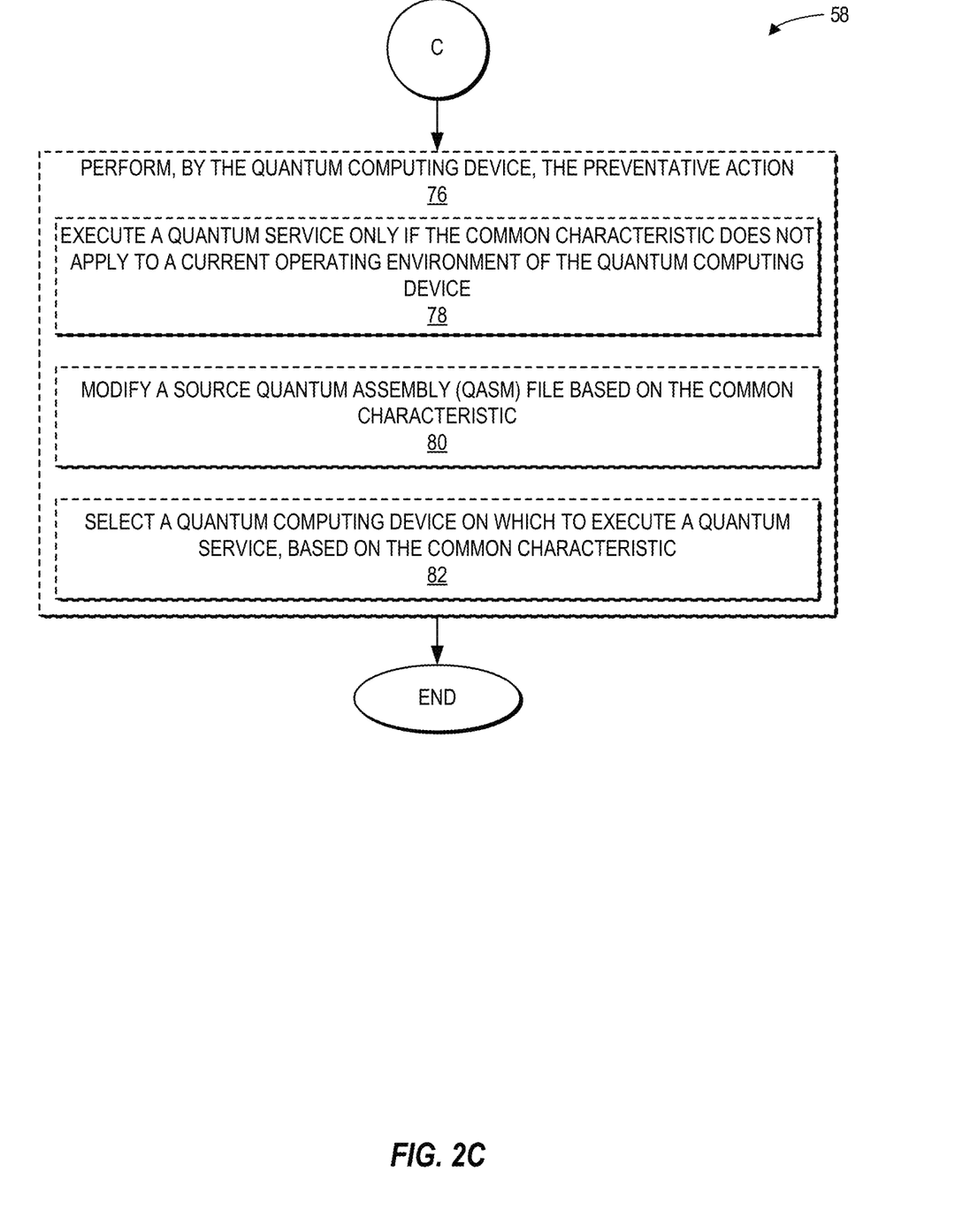

To illustrate exemplary operations performed by the computing system 10 of FIG. 1 for preventing quantum errors using a QECAT table according to one example, FIGS. 2A-2C provide a flowchart 58. Elements of FIG. 1 are referenced in describing FIGS. 2A-2C for the sake of clarity. It is to be understood that, in some examples, some operations illustrated in FIGS. 2A-2C may be performed in an order other than illustrated herein, and/or may be omitted.

Operations in FIG. 2A begin in some examples with the processor device 16 of the computing device 12 (e.g., by executing the QECAT service 42 of FIG. 1) determining that a QEC operation, such as the QEC operation 56 of FIG. 1, has been performed by a QEC service of a quantum computing device (e.g., the QEC service 40 of the quantum computing device 18 of FIG. 1) in response to an occurrence of a quantum error (e.g., the quantum error 52 of FIG. 1) (block 60). The processor device 16 may obtain, from the QEC service 40, metadata (e.g., the metadata 48(0) of FIG. 1) associated with the occurrence of the quantum error 52 (block 62). The processor device 16 may then store the metadata 48(0) in a QECAT table entry of a plurality of QECAT table entries of a QECAT table (e.g., the QECAT table entry 46(0) of the plurality of QECAT table entries 46(0)-46(Q) of the QECAT table 44 of FIG. 1) (block 64).

The processor device 16 identifies a subset (e.g., the subset 50 of FIG. 1) of the plurality of QECAT table entries 46(0)-46(Q) of the QECAT table 44, wherein each QECAT table entry of the subset 50 corresponds to an occurrence of the quantum error 52 (block 66). The processor device 16 next obtains metadata 48(0)-48(1) from each QECAT table entry of the subset 50 (block 68). Operations then continue at block 70 of FIG. 2B.

Turning now to FIG. 2B, the processor device 16 identifies, based on the metadata 48(0)-48(1) from each QECAT table entry of the subset 50, a common characteristic of each occurrence of the quantum error 52 (block 70). The processor device 16 then determines, based on the common characteristic, a preventative action (e.g., the preventative action 54 of FIG. 1) to prevent a future occurrence of the quantum error 52 (block 72). In some examples, the processor device 16 communicates the preventative action 54 to a quantum computing device (e.g., the quantum computing device 18 of FIG. 1) (block 74). Operations in such examples may then continue at block 76 of FIG. 2C.

Referring now to FIG. 2C, the processor device 22 of the quantum computing device 18 in some examples may then perform the preventative action 54 (block 76). In some examples, the operations of block 76 for performing the preventative action 54 may comprise executing a quantum service (e.g., the quantum service 24 of FIG. 1) only if the common characteristic does not apply to a current operating environment of the quantum computing device 18 (block 78). Some examples may provide that the operations of block 76 for performing the preventative action 54 may comprise modifying a source QASM file (e.g., the source QASM file 34 of FIG. 1) based on the common characteristic (block 80). According to some examples, the operations of block 76 for performing the preventative action 54 may comprise selecting a quantum computing device (such as the quantum computing device 18 of FIG. 1) on which to execute the quantum service 24, based on the common characteristic (block 82).

Figure 3:
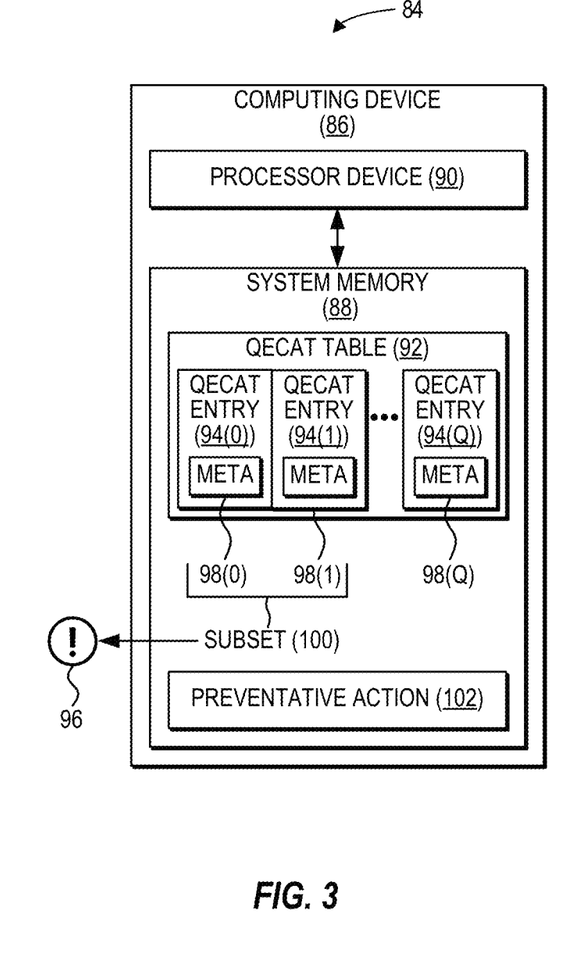
FIG. 3 is a simpler block diagram of the computing system of FIG. 1 for preventing quantum errors using a QECAT table, according to one example.

FIG. 3 is a simpler block diagram of the computing system 10 of FIG. 1 for preventing quantum errors using a QECAT table, according to one example. In the example of FIG. 3, a computing system 84 includes a computing device 86 that comprises a system memory 88 and a processor device 90. The computing device 86 provides a QECAT table 92 that includes a plurality of QECAT table entries (captioned as "QECAT ENTRY" in FIG. 3) 94(0)-94(Q), each of which corresponds to a previous occurrence of a quantum error such as a quantum error 96. The QECAT table entries 94(0)-94(Q) store metadata (captioned as "META" in FIG. 3) 98(0)-98(Q), respectively, that is associated with each corresponding previous occurrence of a quantum error.

In exemplary operation, the processor device 90 identifies a subset 100 of the QECAT table entries 94(0)-94(Q) (in this example, QECAT table entries 94(0) and 94(1)) that correspond to an occurrence of the quantum error 96. The processor device 90 then obtains metadata from each QECAT table entry of the subset 100 (e.g., the metadata 98(0) and 98(1)). The processor device 90 identifies a common characteristic of each occurrence of the quantum error 96 based on the metadata 98(0) and 98(1). Based on the common characteristic, the processor device 90 determines a preventative action 102 to prevent a future occurrence of the quantum error 96.

Figure 4:
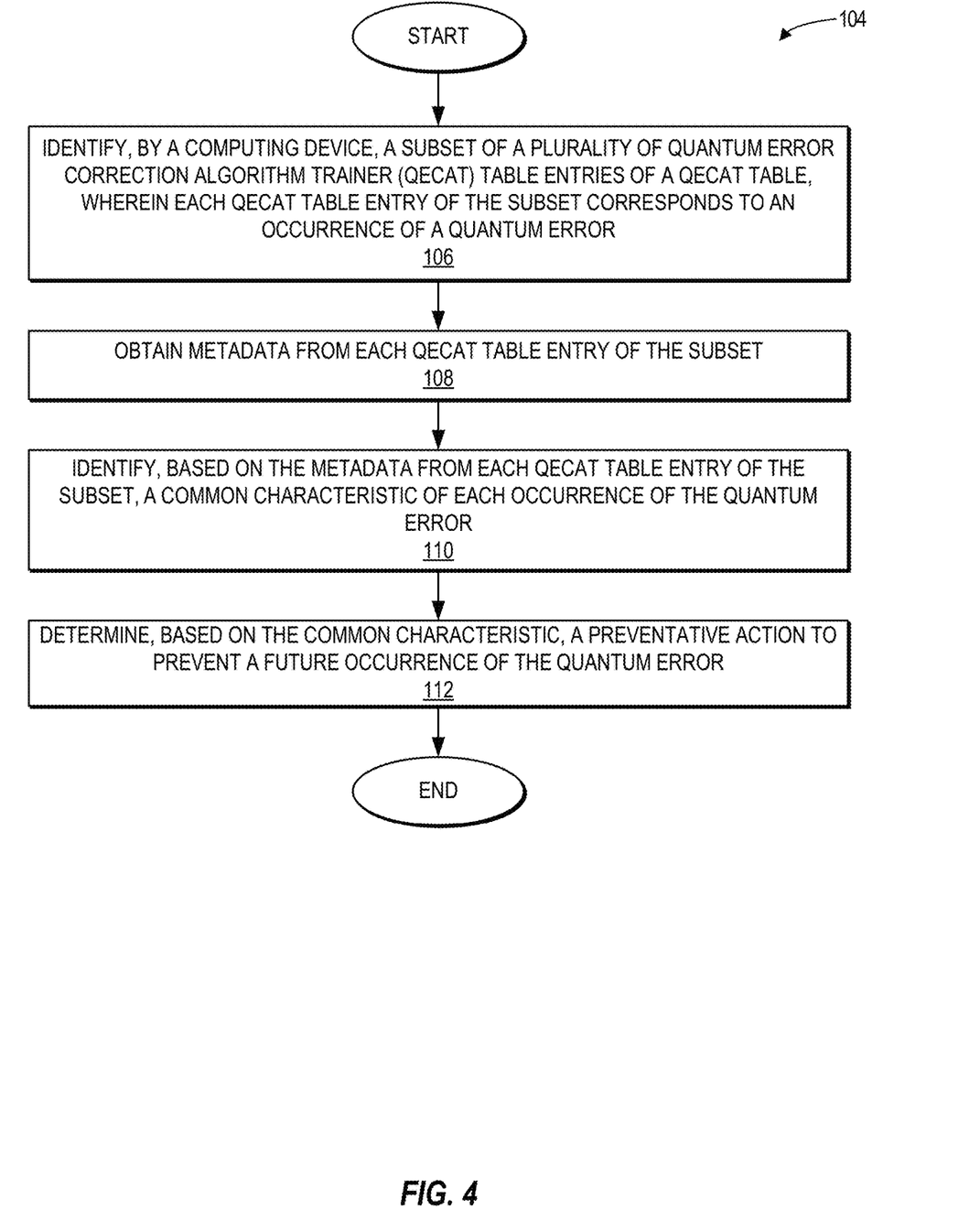
FIG. 4 is a flowchart of a simplified method for preventing quantum errors using a QECAT table by the quantum computing device of FIG. 3, according to one example.

FIG. 4 provides a flowchart 104 to illustrate a simplified method for preventing quantum errors using a QECAT table by the computing device 86 of FIG. 3 according to one example. Elements of FIG. 3 are referenced in describing FIG. 4 for the sake of clarity. In FIG. 4, operations begin with the processor device 90 of the computing device 86 identifying the subset 100 of the plurality of QECAT table entries 94(0)-94(Q) of the QECAT table 92, wherein each QECAT table entry of the subset 100 corresponds to an occurrence of the quantum error 96 (block 106). The processor device 90 next obtains the metadata 98(0)-98(1) from each QECAT table entry of the subset 100 (block 108). The processor device 90 then identifies, based on the metadata 98(0)-98(1) from each QECAT table entry of the subset 100, a common characteristic of each occurrence of the quantum error 96 (block 110). Finally, the processor device 90 determines, based on the common characteristic, the preventative action 102 to prevent a future occurrence of the quantum error 96 (block 112).

Figure 5:
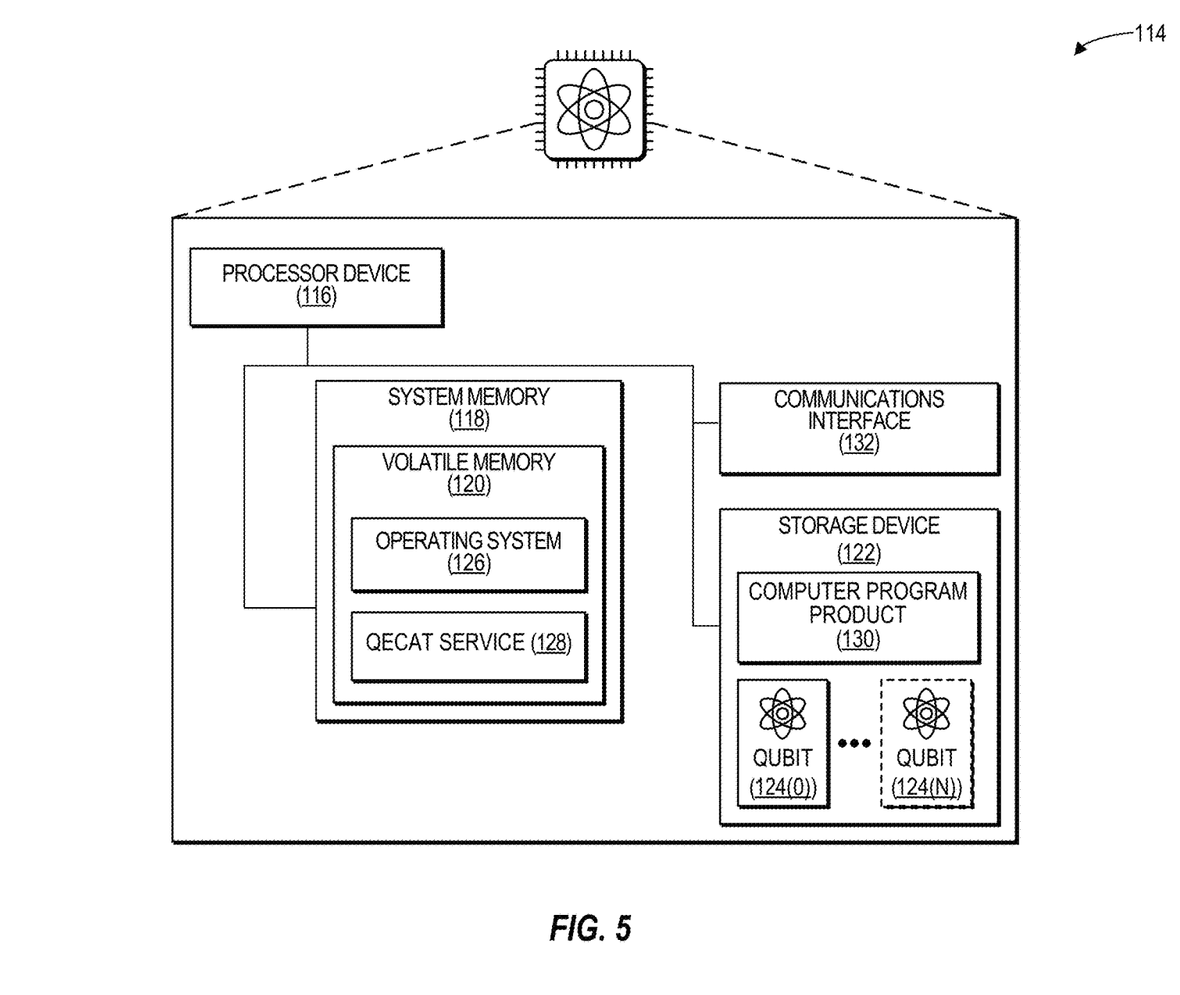
FIG. 5 is a block diagram of a quantum computing device suitable for implementing examples, according to one example.

FIG. 5 is a block diagram of a quantum computing device 114, such as the computing device 12 of FIG. 1, in some examples, and the quantum computing device 18 of FIG. 1, suitable for implementing examples according to one example. The quantum computing device 114 may comprise any suitable quantum computing device or devices. The quantum computing device 114 can operate using classical computing principles or quantum computing principles. When using quantum computing principles, the quantum computing device 114 performs computations that utilize quantum-mechanical phenomena, such as superposition and entanglement. The quantum computing device 114 may operate under certain environmental conditions, such as at or near zero degrees (0°) Kelvin. When using classical computing principles, the quantum computing device 114 utilizes binary digits that have a value of either zero (0) or one (1).

The quantum computing device 114 includes a processor device 116 and a system memory 118. The processor device 116 can be any commercially available or proprietary processor suitable for operating in a quantum environment. The system memory 118 may include volatile memory 120 (e.g., random-access memory (RAM)). The quantum computing device 114 may further include or be coupled to a non-transitory computer-readable medium such as a storage device 122. The storage device 122 and other drives associated with computer-readable media and computer-usable media may provide non-volatile storage of data, data structures, computer-executable instructions, and the like. The storage device may also provide functionality for storing one or more qubits 124(0)-124(N).

A number of modules can be stored in the storage device 122 and in the volatile memory 120, including an operating system 126 and one or more modules, such as a QECAT service 128. All or a portion of the examples may be implemented as a computer program product 130 stored on a transitory or non-transitory computer-usable or computer-readable medium, such as the storage device 122, which includes complex programming instructions, such as complex computer-readable program code, to cause the processor device 116 to carry out the steps described herein. Thus, the computer-readable program code can comprise computer-executable instructions for implementing the functionality of the examples described herein when executed on the processor device 116.

An operator may also be able to enter one or more configuration commands through a keyboard (not illustrated), a pointing device such as a mouse (not illustrated), or a touch-sensitive surface such as a display device (not illustrated). The quantum computing device 114 may also include a communications interface 132 suitable for communicating with other quantum computing systems, including, in some implementations, classical computing devices.

Figure 6:
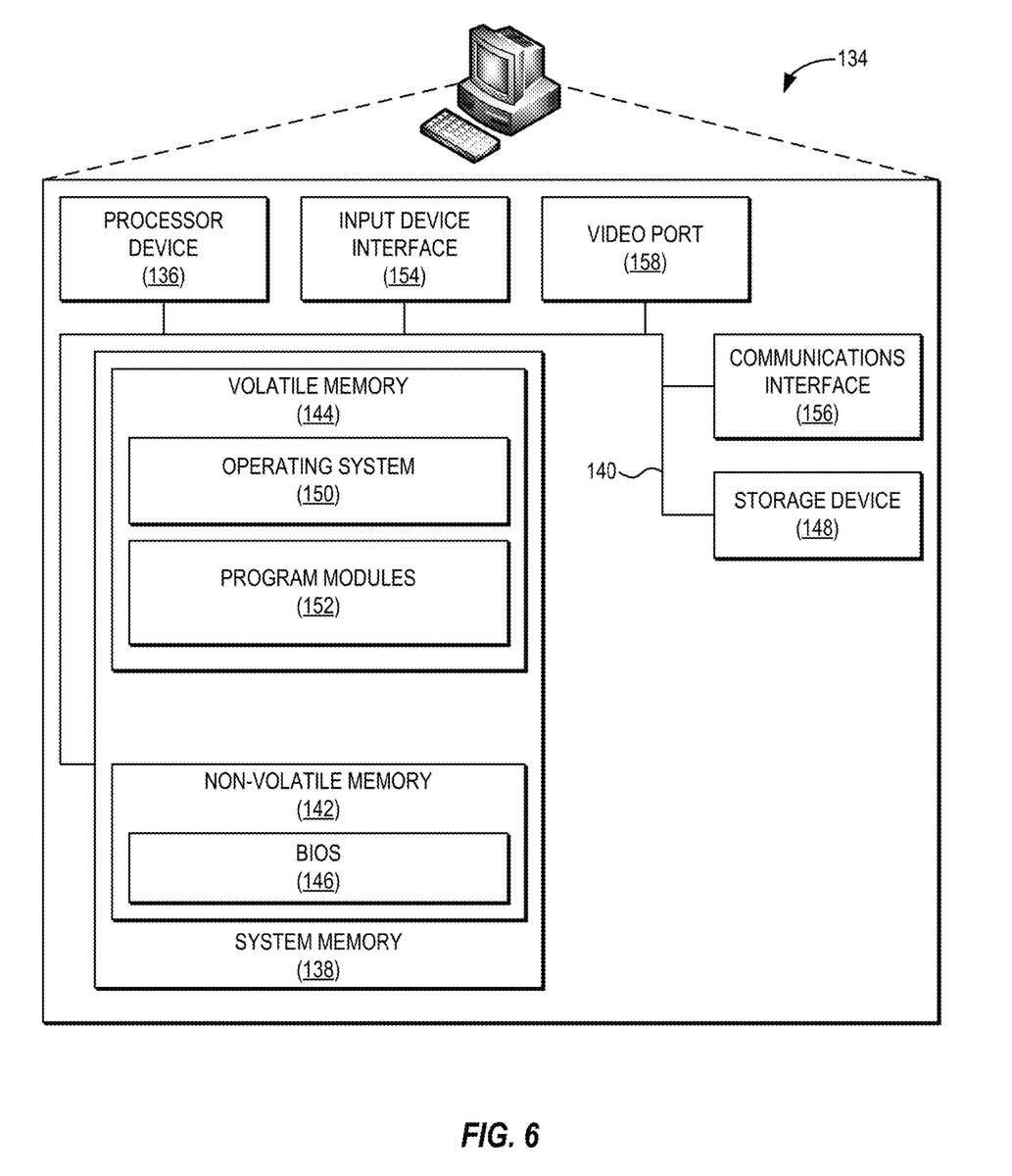
FIG. 6 is a block diagram of a classical computing device suitable for implementing examples, according to one example.

FIG. 6 is a block diagram of a processor-based computing device 134 ("computing device 134" or "classical computing device 134"), such as the computing device 12 of FIG. 1 in some examples, suitable for implementing examples according to one example. The computing device 134 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 134 includes a processor device 136, a system memory 138, and a system bus 140. The system bus 140 provides an interface for system components including, but not limited to, the system memory 138 and the processor device 136. The processor device 136 can be any commercially available or proprietary processor.

The system bus 140 may be any of several types of bus structures that may further interconnect to a memory bus (with or without a memory controller), a peripheral bus, and/or a local bus using any of a variety of commercially available bus architectures. The system memory 138 may include non-volatile memory 142 (e.g., read-only memory (ROM), erasable programmable ROM (EPROM), electrically EPROM (EEPROM), etc.), and volatile memory 144 (e.g., RAM). A basic input/output system (BIOS) 146 may be stored in the non-volatile memory 142 and can include the basic routines that help to transfer information among elements within the computing device 134. The volatile memory 144 may also include a high-speed RAM, such as static RAM, for caching data.

The computing device 134 may further include or be coupled to a non-transitory computer-readable storage medium such as a storage device 148, which may comprise, for example, an internal or external hard disk drive (HDD) (e.g., enhanced integrated drive electronics (EIDE) or serial advanced technology attachment (SATA)), for storage, flash memory, or the like. The storage device 148 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 148 and in the volatile memory 144, including an operating system 150 and one or more program modules 152 which may implement the functionality described herein in whole or in part. It is to be appreciated that the examples can be implemented with various commercially available operating systems 150 or combinations of operating systems 150. All or a portion of the examples may be implemented as a computer program product stored on a transitory or non-transitory computer-usable or computer-readable storage medium, such as the storage device 148, which includes complex programming instructions, such as complex computer-readable program code, to cause the processor device 136 to carry out the steps described herein. Thus, the computer-readable program code can comprise software instructions for implementing the functionality of the examples described herein when executed on the processor device 136. The processor device 136 may serve as a controller, or control system, for the computing device 134 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 136 through an input device interface 154 that is coupled to the system bus 140 but can be connected by other interfaces, such as a parallel port, an Institute of Electrical and Electronic Engineers (IEEE) 1394 serial port, a Universal Serial Bus (USB) port, an IR interface, and the like.

The computing device 134 may also include a communications interface 156 suitable for communicating with a network as appropriate or desired. The computing device 134 may also include a video port 158 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
   identifying, by a computing device, a subset of a plurality of quantum error correction algorithm trainer (QECAT) table entries of a QECAT table, wherein each QECAT table entry of the subset corresponds to an occurrence of a quantum error;
   obtaining metadata from each QECAT table entry of the subset;
   identifying, based on the metadata from each QECAT table entry of the subset, a common characteristic of each occurrence of the quantum error; and
   determining, based on the common characteristic, a preventative action to prevent a future occurrence of the quantum error.

2. The method of claim 1, wherein the metadata comprises one or more of:
   an indication of a quantum error type;
   a timestamp;
   a qubit identifier;
   an indication of a corrective action;
   a source Quantum Assembly (QASM) file identifier;
   an identifier of one or more concurrently executing quantum services;
   an identifier of one or more scheduled quantum services; or
   an indication of an environmental attribute of a quantum computing device.

3. The method of claim 1, wherein the common characteristic comprises:
   a quantum service executing during each occurrence of the quantum error;
   a qubit in use during each occurrence of the quantum error; and
   an operating environment characteristic of a quantum computing device during each occurrence of the quantum error.

4. The method of claim 1, further comprising:
   communicating, by the computing device, the preventative action to a quantum computing device; and
   performing, by the quantum computing device, the preventative action.

5. The method of claim 4, wherein:
   the common characteristic comprises a common characteristic of an operating environment in which the quantum error occurred; and
   performing the preventative action comprises executing a quantum service only if the common characteristic does not apply to a current operating environment of the quantum computing device.

6. The method of claim 4, wherein performing the preventative action comprises modifying a source Quantum Assembly (QASM) file based on the common characteristic.

7. The method of claim 4, wherein performing the preventative action comprises selecting a quantum computing device on which to execute a quantum service, based on the common characteristic.

8. The method of claim 1, further comprising, prior to identifying the subset of the plurality of QECAT table entries:
   determining, by the computing device, that a quantum error correction (QEC) operation has been performed by a QEC service of a quantum computing device in response to a first occurrence of the quantum error;
   obtaining, from the QEC service, first metadata associated with the first occurrence of the quantum error; and
   storing the first metadata in a QECAT entry of the plurality of QECAT table entries.

9. A computing system, comprising a computing device comprising:
   a first system memory; and
   a first processor device communicatively coupled to the first system memory, the first processor device to:
      identify a subset of a plurality of quantum error correction algorithm trainer (QECAT) table entries of a QECAT table, wherein each QECAT table entry of the subset corresponds to an occurrence of a quantum error;
      obtain metadata from each QECAT table entry of the subset;
      identify, based on the metadata from each QECAT table entry of the subset, a common characteristic of each occurrence of the quantum error; and
      determine, based on the common characteristic, a preventative action to prevent a future occurrence of the quantum error.

10. The computing system of claim 9, wherein the metadata comprises one or more of:
    an indication of a quantum error type;
    a timestamp;
    a qubit identifier;
    an indication of a corrective action;
    a source Quantum Assembly (QASM) file identifier;
    an identifier of one or more concurrently executing quantum services;

an identifier of one or more scheduled quantum services; or an indication of an environmental attribute of a quantum computing device.

11. The computing system of claim 9, wherein the common characteristic comprises:
- a quantum service executing during each occurrence of the quantum error;
- a qubit in use during each occurrence of the quantum error; and
- an operating environment characteristic of a quantum computing device during each occurrence of the quantum error.

12. The computing system of claim 9, further comprising a quantum computing device comprising:
- a second system memory; and
- a second processor device;
- wherein:
  - the first processor device is further to communicate the preventative action to the quantum computing device; and
  - the second processor device is to perform the preventative action.

13. The computing system of claim 12, wherein:
- the common characteristic comprises a common characteristic of an operating environment in which the quantum error occurred; and
- to perform the preventative action is to execute a quantum service only if the common characteristic does not apply to a current operating environment of the quantum computing device.

14. The computing system of claim 12, wherein to perform the preventative action is to modify a source Quantum Assembly (QASM) file based on the common characteristic.

15. The computing system of claim 12, wherein to perform the preventative action is to select a quantum computing device on which to execute a quantum service, based on the common characteristic.

16. The computing system of claim 9, wherein the first processor device is further to, prior to identifying the subset of the plurality of QECAT table entries:
- determine that a quantum error correction (QEC) operation has been performed by a QEC service of a quantum computing device in response to a first occurrence of the quantum error;
- obtain, from the QEC service, first metadata associated with the first occurrence of the quantum error; and
- store the first metadata in a QECAT entry of the plurality of QECAT table entries.

17. A non-transitory computer-readable medium having stored thereon computer-executable instructions that, when executed, cause one or more processor devices to:
- identify a subset of a plurality of quantum error correction algorithm trainer (QECAT) table entries of a QECAT table, wherein each QECAT table entry of the subset corresponds to an occurrence of a quantum error;
- obtain metadata from each QECAT table entry of the subset;
- identify, based on the metadata from each QECAT table entry of the subset, a common characteristic of each occurrence of the quantum error; and
- determine, based on the common characteristic, a preventative action to prevent a future occurrence of the quantum error.

18. The non-transitory computer-readable medium of claim 17, wherein the metadata comprises one or more of:
- an indication of a quantum error type;
- a timestamp;
- a qubit identifier;
- an indication of a corrective action;
- a source Quantum Assembly (QASM) file identifier;
- an identifier of one or more concurrently executing quantum services;
- an identifier of one or more scheduled quantum services; or
- an indication of an environmental attribute of a quantum computing device.

19. The non-transitory computer-readable medium of claim 17, wherein the common characteristic comprises:
- a quantum service executing during each occurrence of the quantum error;
- a qubit in use during each occurrence of the quantum error; and
- an operating environment characteristic of a quantum computing device during each occurrence of the quantum error.

20. The non-transitory computer-readable medium of claim 17, wherein the computer-executable instructions further cause the one or more processor devices to:
- communicate the preventative action to a quantum computing device; and
- perform, by the quantum computing device, the preventative action.

* * * * *